Dec. 9, 1941. I. N. ODELL 2,265,571
COLOR FILTER FOR PHOTOGRAPHIC SAFELIGHT LAMP
Filed June 13, 1940
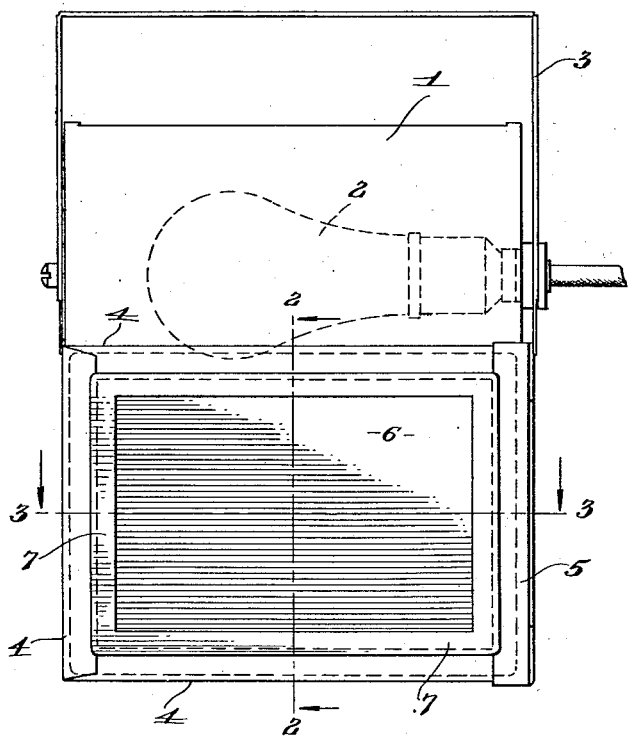
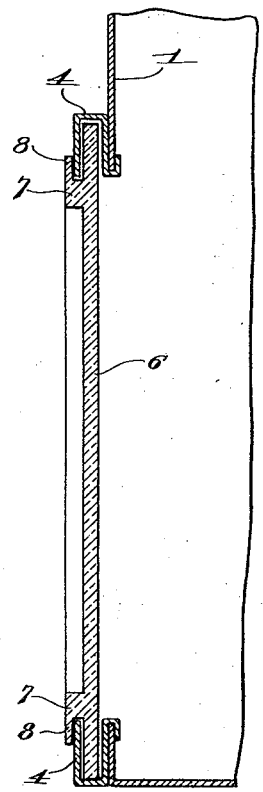
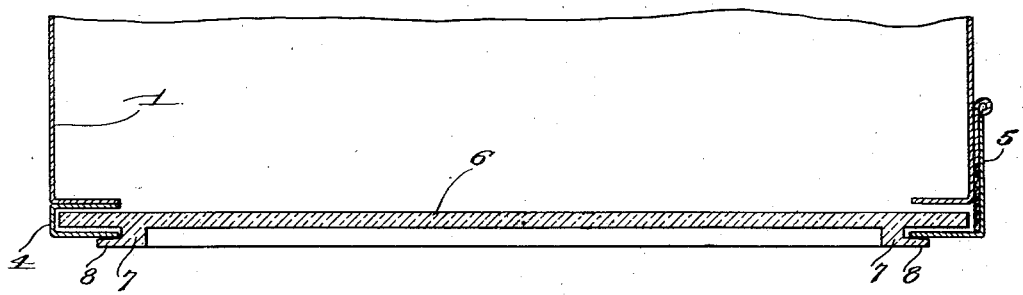
INVENTOR.
Isaac N. Odell
BY Harold L. Stonebraker
his ATTORNEY.

Patented Dec. 9, 1941

2,265,571

UNITED STATES PATENT OFFICE 2,265,571

COLOR FILTER FOR PHOTOGRAPHIC SAFELIGHT LAMP

Isaac N. Odell, Rochester, N. Y., assignor to Defender Photo Supply Co., Inc., Rochester, N. Y., a corporation of New York Application June 13, 1940, Serial No. 340,234

1 Claim. (Cl. 240—20)

This invention relates to a color filter for a photographic safelight lamp, and has for its object to afford a practical, efficient, and economical construction for the purpose.

In general, the practice heretofore has been to use a glass panel for this purpose, usually composed of two thicknesses with a sheet of colored gelatin therebetween, and this has had various disadvantages which the present invention is designed to overcome, by constructing a color filter for the purpose from plastic material that is suitably dyed and can be molded or formed to the desired shape.

Where glass panels such as described above have been used with a gelatin layer, they have been subject to more or less frequent replacement due to the effects of heat on the gelatin, and it has been necessary to fit such a glass unit tightly against the retaining members of the lamp housing in order to prevent leakage of light from the interior of the housing, and these objections are removed by the present invention, which, being formed of dyed plastic material is practically unbreakable, and unaffected by any temperatures to which it would ordinarily be subjected in normal operations, while the unit can be so formed as to permit of a relatively loose fit with the lamp housing and the retaining surfaces thereof while at the same time affording effective light sealing means.

More particularly, the invention has for its purpose to afford a color filter of dyed plastic material so formed as to present grooves, or recesses, into which the retaining members of the lamp housing fit, the flanges afforded by the grooves overlying said retaining members of the lamp housing and affording an effective light lock or seal that prevents leakage of light from the interior of the lamp housing around the edges of the filter.

To these and other ends, the invention consists in the construction and arrangement of parts that will appear clearly from the following description when read in conjunction with the accompanying drawing, the novel features being pointed out in the claim following the specification.

In the drawing:

Fig. 1 is a view in side elevation showing a safelight lamp housing with a preferred embodiment of the invention applied thereto;

Fig. 2 is a sectional view on the line 2—2 of Fig. 1 looking in the direction indicated, and Fig. 3 is a sectional view on the line 3—3 of Fig. 1 looking in the direction indicated.

Referring more particularly to the drawing in which like reference characters refer to the same parts throughout the several views, the invention is here shown as applied to a conventional type of safelight lamp that includes a housing 1 within which is located a light bulb 2, while 3 is the usual supporting bracket.

The lower part of the housing 1 is provided at its lower portion with an opening in the front wall through which light from the interior is admitted through the color filter, and around said opening on three sides thereof is a guideway or recess formed by a channel portion attached to the housing and affording retaining members 4, while 5 designates a door or gate pivoted to the housing at one end and including a retaining member adapted to overlie the filter and the adjacent ends of the side retaining members 4, and to be disengaged therefrom to permit removal of the filter.

As thus far described, the structure is old, the general practice having been to employ a color filter that would fit tightly in the guideways formed by the retaining members 4 and 5, in order to prevent leakage of light around the edges of the filter, which has usually consisted in layers of glass taped or otherwise secured at their edges and containing therebetween a dyed gelatin layer.

Such color filters have been objectionable owing to the destructive effect of heat on the gelatin layer, necessitating frequent replacement of the filter, and also the fact that the filter must be fitted closely and tightly into the guideways of the housing. These objections are overcome with the present invention in which the filter is formed by molding or otherwise frrom plastic material of any suitable nature, such as that commercially known at "Lucite," the plastic material being colored with a suitable dye to give the desired filter effect prior to the molding or forming operation, and the filter being so constructed as to be positionable quickly and easily in the guideways of the lamp housing and to fit loosely therein, but cooperating in a manner as to prevent the leakage of any light.

The color filter which is composed of dyed plastic material consists of a body portion 6, the edges of which are adapted to fit into the guideways afforded by the retaining members 4 and 5, and to underlie said retaining members of the lamp housing and be held thereby, but said edges are of a thickness to fit loosely therein so that the filter can be readily slid into place in the housing when the gate 5 is opened for this purpose.

In order to prevent leakage of light around the edges of the filter from the interior to the exterior of the lamp housing, there are provided enlarged portions 7 extending transversely from the body portion 6 entirely around the same and spaced from the edges thereof, as shown, in parallel relation to said edges. Said enlarged portions are provided with grooves afforded by laterally extending flanges 8, which project toward the adjacent edges of the filter, and overlie the retaining members 4 that project substantially into the grooves afforded between the lateral flanges 8 and the adjacent surfaces of the body portion 6.

This arrangement, affording a double and reversely arranged interlock between the guideway of the housing and the color filter, presents an effective light lock or seal that acts as an effective light guard, preventing the passage of any light around the edges of the filter or anywhere to the exterior except through the body thereof, irrespective of looseness or freedom of movement between the guideways of the housing and the color filter.

The filter is preferably formed in one piece and constructed in the manner herein disclosed, although it may be otherwise made and modifications had without departing from the principle of the invention, and this application is intended to cover any changes or departures that come within the purposes of the improvement or the scope of the following claim.

I claim:

A photographic safelight lamp color filter composed of dyed plastic material and including a body portion, the peripheral edges of which are positionable under retaining members of a lamp housing, and light sealing portions comprising transversely extending enlarged portions located parallel to said peripheral edges and spaced inwardly therefrom, said enlarged portions having longitudinally extending grooves therein adjacent to the body portion to receive said retaining members of the lamp housing, whereby the filter may fit loosely under the retaining members and the light sealing portions act as a light seal to exclude light around the edges of the filter.

ISAAC N. ODELL.